(12) United States Patent
Shigematsu

(10) Patent No.: US 6,842,315 B2
(45) Date of Patent: Jan. 11, 2005

(54) MAGNETORESISTIVE EFFECT HEAD AND A METHOD OF PRODUCING THE SAME

(75) Inventor: Satoshi Shigematsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 10/067,912

(22) Filed: Feb. 8, 2002

(65) Prior Publication Data

US 2003/0039082 A1 Feb. 27, 2003

(30) Foreign Application Priority Data

Aug. 23, 2001 (JP) ........................................ 2001-252277

(51) Int. Cl.⁷ ............................................... G11B 5/39
(52) U.S. Cl. ............................................... 360/324.12
(58) Field of Search .................... 360/324.1, 324.11, 360/324.12, 324.2

(56) References Cited

U.S. PATENT DOCUMENTS

| | | | | |
|---|---|---|---|---|
| 5,867,351 A | * | 2/1999 | Gill ........................ | 360/324.11 |
| 6,185,078 B1 | * | 2/2001 | Lin et al. ................ | 360/324.12 |
| 6,266,218 B1 | * | 7/2001 | Carey et al. ........... | 360/324.12 |
| 6,545,848 B1 | * | 4/2003 | Terunuma ............... | 360/324.12 |
| 6,636,396 B1 | * | 10/2003 | Gill ........................ | 360/324.12 |
| 6,721,143 B2 | * | 4/2004 | Zheng et al. ............ | 360/324.1 |
| 6,721,147 B2 | * | 4/2004 | Aoshima et al. ....... | 360/324.12 |
| 2003/0011943 A1 | * | 1/2003 | Webb et al. ............. | 360/324.1 |

FOREIGN PATENT DOCUMENTS

| JP | A-03-125311 | 5/1991 |
|---|---|---|
| JP | A-06-084145 | 3/1994 |
| JP | A-09-282618 | 10/1997 |

* cited by examiner

Primary Examiner—David L. Ometz
(74) Attorney, Agent, or Firm—Antonelli, Terry, Stout & Kraus, LLP

(57) ABSTRACT

A magneto-resistive head including: a soft-magnetic film arranged to be in contact with both end portions of the spin bulb film; and a permanent magnet film arranged so as to be in contact with the lower portion of the soft-magnetic film and not in contact with the free layer of the spin bulb film. With the structure in which the lower portion of the free layer of the spin bulb film is in direct contact with the end portion of the soft-magnetic film while the free layer of the spin bulb film is not in contact with the permanent magnet film, it is possible to provide a spin bulb element having a high reproduction sensitivity even when the track width is small, and a production method of the same.

3 Claims, 4 Drawing Sheets

MAGNETORESISTIVE EFFECT HEAD AND A METHOD OF PRODUCING THE SAME

BACKGROUND OF THE INVENTION

1. Field of the Invention

The present invention relates to structure of a magnetoresistive head using a magnetically stable spin bulb element used in a high-density hard disc and the like and to a production method thereof.

2. Description of the Related Art

With increase of the recording density of a magnetic disc apparatus, a spin bulb head in which a spin bulb film is used as a reading out element is now used in practice. The spin bulb film has a structure of two ferromagnetic films sandwiching non-magnetic Cu film. One of the ferromagnetic films called a fixed layer is in contact with an anti-ferromagnetic film and its magnetization direction is not changed by a signal magnetic field change from a magnetic recording medium because of the exchange coupling magnetic field with the anti-ferromagnetic film. The other ferromagnetic film called a free layer has a magnetization direction rotated by the signal magnetic field from the magnetic recording medium.

With change of the signal magnetic field from the magnetic recording medium, an angle defined by the fixed layer and the free layer is changed causing a resistance change due to the magneto-resistive effect. This resistance change is read out as a signal. It is known that linear feature of the signal is increased because magnetization of the free layer is directed vertical to the signal magnetic field direction in a bias state while magnetization of the fixed layer is directed in the signal magnetic field direction (or anti-parallel direction).

The fixed layer may be two ferromagnetic films anti-parallel to each other. In this case, Ru or the like is inserted between the two layers and the magnetization direction of the two-layered fixed layer is directed to anti-parallel by the anti-ferromagnetic coupling magnetic field generated via the Ru. This structure is called a layered ferri structure.

As the material of the free layer and the fixed layer, it is possible to use NiFe, Co, CoFe, and combination of these layered films. As the material of the anti-ferromagnetic film, it is possible to use MnPt, CrMnPt, NiMn, MnIr, NiO, and the like.

FIG. 4 shows, as an example, structure of a read-out element using the conventional spin bulb film. FIG. 4 shows the read-out element viewed from the magnetic recording medium. A spin bulb film MR is arranged between two magnetic shield films S1 and S2 via insulating films 11 and 12. At the both ends of the spin bulb film MR, a permanent magnet film D called a magnetic domain control film and an electrode film L for flowing signal detection current are arranged.

This structure is called "hard bias structure" and is disclosed in JP-A-3-125311. The free layer F has magnetization direction in X direction (track width direction) in a bias state while the fixed layer P has magnetization directed to the paper depth (MR height direction). A magnetic domain control film is provided to suppress Barkhausen noise caused by generation of a magnetic domain in the free layer F. The magnetic domain control film has a magnetization direction in X direction to assist the magnetization direction of the free layer F in a bias state.

As the material of the permanent magnet D, it is possible to use CoPt, CoCrPt, CoCrTa, and the like. It is known that these materials can exhibit a high coercive force when an undercoat film is provided and a two-layered structure of the permanent magnet film D and a Cr film as the undercoat film is used. JP-A-6-84145 discloses a structure in which the permanent magnet film D is replaced by a laminate film of a ferromagnetic film and an anti-ferromagnetic film. This ferromagnetic film in contact with the anti-ferromagnetic film and has a magnetization fixed in the track width direction by the exchange coupling magnetic field with the anti-ferromagnetic film, thereby exhibiting a function equivalent to the permanent magnet film. As the material of the anti-ferromagnetic film of the magnetic domain control film, it is possible to use a material identical to the anti-ferromagnetic film used for the spin bulb film MR.

To increase the recording density in the track width direction, it is necessary to reduce the space between the electrode films and reduce the magnetic reproduction width (track width). However, the hard bias structure causes a problem as follows. Firstly, FIG. 5 shows an X-direction component of a leak magnetic field from the magnetic domain control film D in respective track width direction positions of the free layer F. The leak magnetic field from the magnetic domain control film D is large at the element end in the proximity to the magnetic domain control film D and is reduced toward the element center portion.

FIG. 6 shows an output sensitivity of the element at respective track width direction positions. In the element end portion, the magnetic domain control magnetic field is large and the free layer magnetization is hardly rotated against the signal magnetic field from the medium. Thus, a low-sensitivity region exists. That is, an actual track width is increased with respect to the high-sensitivity region, which disturbs reduction of the track width.

Furthermore, as shown in FIG. 7, when the space between the electrode films L (space between magnetic domain control films) is reduced to a value identical to the low-sensitivity region width, the entire element becomes a low-sensitivity region, remarkably lowering the reproduction sensitivity. The low-sensitivity region width is almost identical distance between the end portion of the magnetic domain control film D and the magnetic shield film. This is because the leak magnetic field from the magnetic domain control film D can easily enters the magnetic shield film and the leak magnetic field from the magnetic control film D is reduced at a position where the distance from the magnetic domain control film D is greater than the distance from the end portion of the magnetic domain control film D to the magnetic shield film.

To solve this problem, JP-A-9-282618 discloses an electrode overlap structure. In the electrode overlap structure, the electrode films L are arranged so as to cover the spin bulb film MR and the distance between the electrode films L is smaller than the distance between the magnetic domain control films D. In this case, signal detection current flows to the electrode end portion having a smaller resistance than the element end portion having a low sensitivity. Accordingly, it is possible to reduce the reproduction output from the low-sensitivity region and to use only the high-sensitivity region. However, it is practically impossible to make zero the current flowing to the low-sensitivity region of the spin bulb film MR and the reproduction track width is increased than the distance between the electrodes.

SUMMARY OF THE INVENTION

Even the electrode overlap structure cannot make the low-sensitivity region zero, it is difficult to obtain a small track width. Moreover, in the electrode overlap structure, it is necessary to form the electrode film and the magnetic control film using different masks, thereby complicating the element forming process and positions of the two masks may not be matched with each other.

It is therefore an object of the present invention to provide a head structure enabling to reduce the low-sensitivity region for a small track width using a simple production process and the production process of the head.

The magneto-resistive head according to the present invention comprises: a first and second magnetic shield film; a spin bulb film formed between the first and the second shield films via an insulating film; a soft-magnetic film arranged to be in contact with both end portions of a free layer of the spin bulb film; a permanent magnet film arranged so as to be in contact with the lower portion of the soft-magnetic film and not in contact with the free layer of the spin bulb film; and an electrode film for applying a signal detection current to the spin bulb film.

The magneto-resistive head production method according to the present invention comprises steps of:
forming a first magnetic shield film and a first insulating film;
forming a spin bulb film on the first insulating film;
forming a lift-off resist for patterning the spin bulb film;
patterning the spin bulb film by ion milling;
successively forming a permanent magnet film, a soft-magnetic film, and an electrode film on the first insulating film, the spin bulb film, and the lift-off resist which have been patterned;
removing the lift-off resist and the permanent magnet film, the soft-magnetic film, and the electrode film which are attached onto the lift-off resist; and
forming a second insulating film and a second magnetic shield film on the electrode film and the spin bulb film;
wherein an ion injection angle IM1 with respect to the substrate normal direction during the ion milling, an angle D1 as a film forming particle injection angle for forming the permanent magnet film with respect to the substrate normal, and an angle D2 as a film forming particle injection angle for forming the soft-magnetic film with respect to the substrate normal are in relationships as follows: D1 is smaller than IM1 (D1<IM1), and IM1 is not greater than D2 (IM1 ≦D2).

DESCRIPTION OF THE EMBODIMENTS

Figure 1:
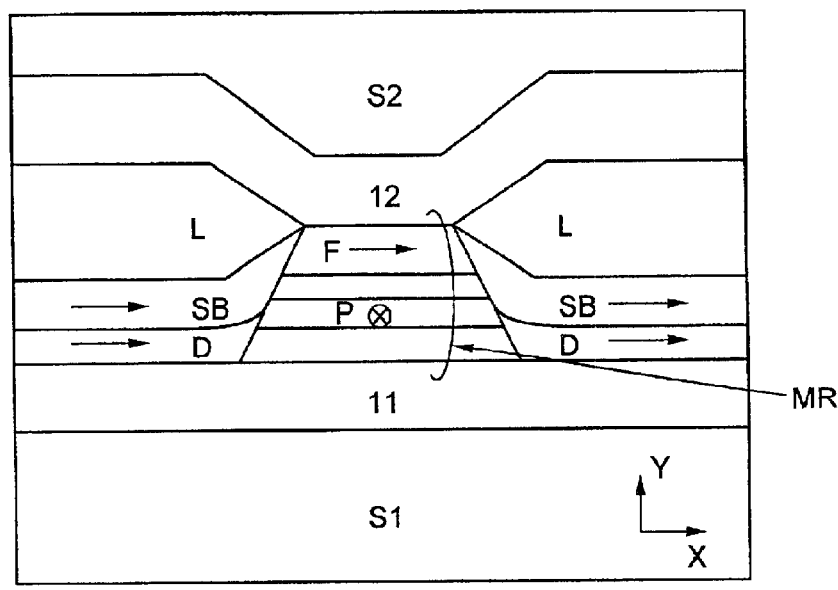
FIG. 1 shows structure of a magneto-resistive head using a spin bulb element according to the present invention viewed from an opposing side of a recording medium.

FIG. 1 shows a magneto-resistive head according to an embodiment of the present invention. A spin bulb film MR is arranged between two magnetic shield films S1 and S2 via insulating films 11 and 12. The magnetic shield films S1 and S2 are formed by NiFe while the insulating films 11 and 12 are formed by $Al_2O_3$. A pair of soft-magnetic films SB is arranged at end portions of the free layer F of the spin bulb film MR. End portions of the soft-magnetic films SB are in direct contact with the end portions of the free layer F. Furthermore, a permanent magnet films D are arranged at positions apart from the end portions of the free layer F by a distance almost identical to the low-sensitivity region width and in contact with the soft-magnetic films SB. The contact position may be an upper side or lower side of the soft-magnetic film SB. However, to increase the coercive force of the permanent magnet film D formed by Co, a non-magnetic undercoat film is required. When the permanent magnet film D is arranged on the soft-magnetic film SB, it is difficult for the soft-magnetic film SB to be in direct contact with the permanent magnet film D. Accordingly, to obtain a large coercive force of the permanent magnet film D and direct contact of the soft-magnetic film SB with the permanent magnet film D, it is preferable to form the soft-magnetic film SB on the permanent magnet film D.

Figure 2:
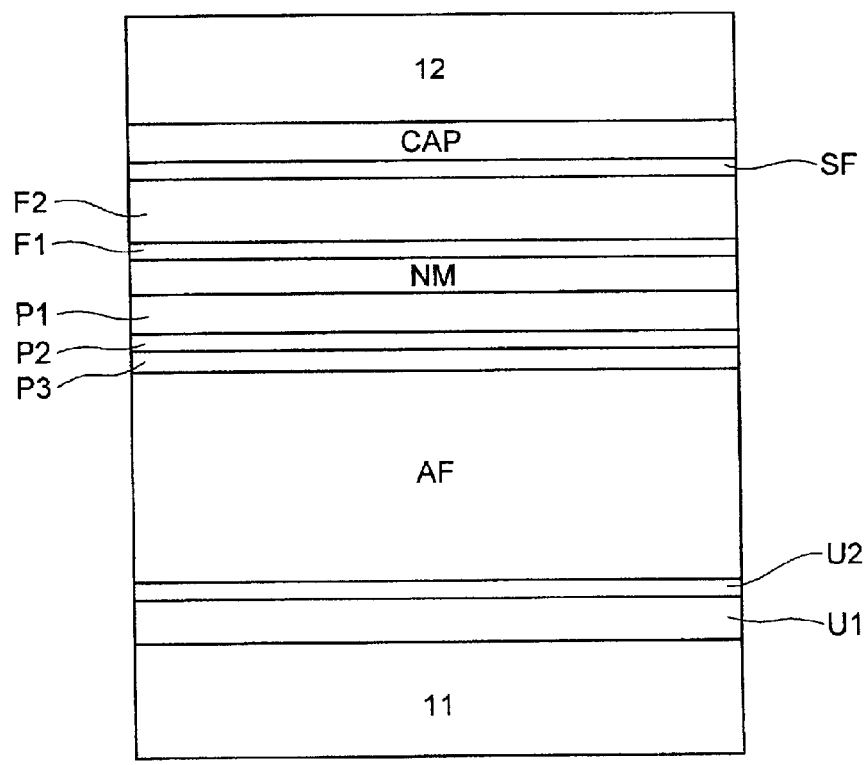
FIG. 2 shows structure of the spin bulb element according to the present invention.

FIG. 2 shows structure of the spin bulb film MR. On the insulating film 11, a Ta film U1 and a NiFe film U2 are layered as undercoat films. Furthermore, as the anti-ferromagnetic film AF, a MnPt film is layered. The fixed layer has a layered ferri fixed structure formed by a CoFe film P1, a Ru film P2, and a CoFe film P3. The non-magnetic layer NM is formed by a Cu film. The free layer also has a layered structure formed by a CoFe film F1 and a NiFe film F2. The protection film CAP is formed by a Ta film. The spin filter film SF is a Cu film. This spin filter film SF functions to prevent atom diffusion of the Ta protection film CAP and the NiFe film F2 of the free layer F and to enhance the soft magnetic characteristic and resistance change ratio of the free layer F. The spin bulb film MR is composed of, for example, Ta 20 Å/Cu 10 Å/NiFe 30 Å/CoFe 10 Å/Cu 20 Å/CoFe 20 Å/Ru 8 Å/CoFe 12 Å/MnPt 120 Å/NiFe 10 Å/Ta 20 Å. This spin bulb film MR has a resistance change ratio of 10% and a sheet resistance 20 Ω/□. Moreover, the NiFe film F2 and the CoFe film F1 of the free layer have saturation magnetic flux density of 1T and 1.9T, respectively. Accordingly, an average saturation magnetic flux density is 1.225T and a product of the saturation magnetic flux density with the film thickness is 49 Å T. Instead of this spin bulb film, it is also possible to use a generally known spin bulb film.

Referring back to FIG. 1, the permanent magnet film D and the undercoat film is CoCrPt 200 Å/Cr 50 Å. This permanent magnet film D has a coercive force of $1.58 \times 10^2$ kA/M (2000 Oe) and a saturation magnetic flux density of 0.8 T. The Cr film is the undercoat film for controlling the crystal orientation of the CoCrPt film as the permanent magnet film D and increasing the coercive force. As the permanent magnet film D it is possible to use CoPt or CoCrTa, and as the undercoat film it is also possible to use CrTi, CrV, CrMo, or the like. The distance between the end portion of the free layer F and the end portion of the permanent magnet film D is 50 nm.

The soft-magnetic film SB is CoFe30 Å. The soft-magnetic film SB has a coercive force of $7.8 \times 10^2$ A/m (10 Oe) and a saturation magnetic flux density of 1.9 T. Thus, the saturation magnetic flux density of the soft-magnetic film SB is equal to that of the free layer F multiplied 1.55. Moreover, a product of the saturation magnetic flux density of the soft-magnetic layer SB and the film thickness is 57.0 Å T, which is equal to that of the free layer F multiplied 1.16. As the soft-magnetic film SB, it is possible to use a soft-magnetic film containing Co, Ni, and Fe as main contents. It is preferable that the saturation magnetic flux density be high and the coercive force be small.

The electrode film L on the soft-magnetic film SB is formed by Ta 50 Å/Au 200 Å/Ta 50 Å.

Moreover, the permanent magnet film D may be replaced by an anti-ferromagnetic film. Unlike the permanent magnet film D, the anti-ferromagnetic film may be formed as the upper portion or lower portion of the soft-magnetic film SB. Magnetization of the soft-magnetic film SB in the portion in contact with the permanent magnet film D is orientated in parallel to the magnetization direction of the permanent magnet film D by the exchange coupling magnetic field from the permanent magnet film D. The leak magnetic field from the permanent magnet film D reaches free layer F through the soft-magnetic film SB arranged between the permanent magnet film D and the free layer F. Here, since the permanent magnet film D is apart from the free layer F, the magnetic domain control magnetic field in the free layer F is sufficiently reduced and the entire spin bulb film MR becomes the high-sensitivity region.

Moreover, the low-sensitivity region the track width end portion is replaced by the soft-magnetic film SB having a small magneto-resistive effect and accordingly, there is no low-sensitivity region. The distance between the end portion of the free layer F and the end portion of the permanent magnet film D is almost equal to the low-sensitivity region. That is, the distance between the end portion of the free layer and the end portion of the permanent magnet film D is almost equal to a distance between the end portion of the permanent magnet film D and the magnetic shield film S1. When the distance between the end portion of the free layer F and the end portion of the permanent magnet film D is greater than the distance between the end portion of the permanent magnet film D and the magnetic shield film S1, the low-sensitivity region is reduced but it impossible to obtain a sufficient magnetic domain control by the permanent magnet film D. On the contrary, when the distance between the end portion of the free layer F and the end portion of the permanent magnet film D is smaller than the distance between the end portion of the permanent magnet film D and the magnetic shield film S1, a low-sensitivity region is generated.

Moreover, to apply a sufficient magnetic domain control magnetic field to the end portion of the free layer F, the end portion of the free layer F should be in direct contact with the end portion of the soft-magnetic film SB. Furthermore, the soft-magnetic film SB has a saturation magnetic flux density not less than the saturation magnetic flux density of the free layer F multiplied by 0.8.

Moreover, the saturation magnetic flux density of the product of the soft-magnetic film SB and the film thickness (Bs·t) is approximately equal to the Bs·t of the free layer F multiplied by 1 to 10.

Next, explanation will be given on a process for forming the magneto-resistive head.

Figure 3A:
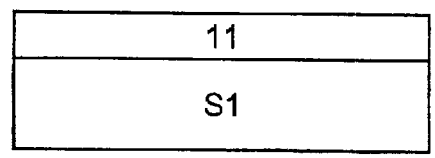
FIG. 3A to FIG. 3D show a production process of the magneto-resistive head according to the present invention.

A first magnetic shield film S1 and a first insulating film 11 are formed on a substrate (FIG. 3A).

Figure 3B:
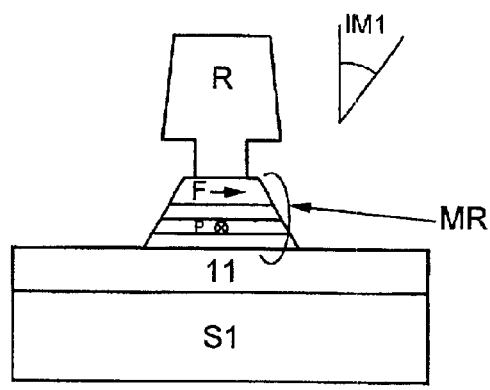

Subsequently, a spin bulb film MR is formed. Next a two-layered resist R is formed for lift-off and the end portion of the spin bulb film MR is removed by ion milling and patterned (FIG. 3B). Here, the angle IM1 defined by the ion injection direction and the substrate normal is 40 degrees. When the free layer F of the spin bulb film MR is above the fixed layer P, there is no need to remove the entire spin bulb film MR and it is possible to remove only the free layer F.

Subsequently, a Cr undercoat film and a permanent magnet film D are formed by the ion beam sputter method or the collimate sputter method while controlling the injection angle of the film forming particles. Here, if D1 is an angle defined by the injection direction of the film forming particles of the Cr undercoat film and the permanent magnet film D, D1 is made 0 degrees so that the end portion of the free layer F is not in contact with the end portion of the permanent magnet film D.

Figure 3C:
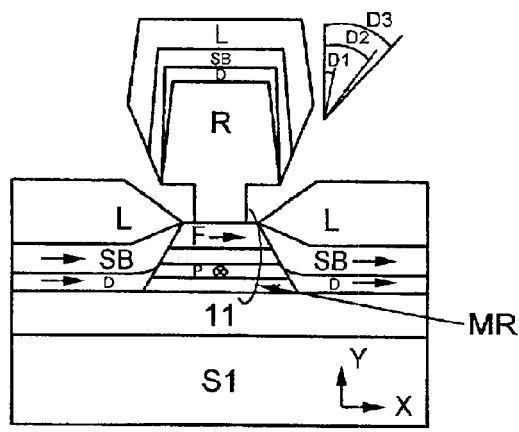

Subsequently, a soft-magnetic film SB and an electrode film L are formed by the ion beam sputter method or the collimate sputter method while controlling the injection angle of the film forming particles (FIG. 3C). Here, if D2 and D3 are angles defined by the injection direction of the film forming particles of the soft-magnetic film SB and the electrode film L with respect to the substrate normal direction, respectively, D2 is made 40 degrees, which enables the end portion of the free layer F to be in direct contact with the soft-magnetic film SB. The injection angle D3 of the electrode film L is preferably identical to D2.

Thus, by defining D1 smaller than IM1 (D1<IM1), the end portion of the free layer F is not in contact with the end portion of the permanent magnet film D.

Moreover, by defining IM1 not greater than D2 (IM1≦D2), the end portion of the free layer F can be in direct contact with the soft-magnetic film SB.

The permanent magnet film D, the soft-magnetic film SB, and the electrode film L are preferably formed in a vacuum used by the ion milling apparatus for removing the spin bulb film MR so as to reduce the contact resistance of the respective films with the spin bulb film MR and to reduce the contact resistance between the respective films. Moreover, when these films are formed in the same vacuum, the free layer F can be in magnetic contact with the soft-magnetic film SB, and the soft-magnetic film SB can be in magnetic contact with the permanent magnet film D.

Subsequently, the two-layered resist R is lifted off and the permanent magnet film D, the soft-magnetic film SB, and the electrode film L are formed at the end portion of the spin bulb film MR. Since the permanent magnet film D, the soft-magnetic film SB, and the electrode film L are formed by a single resist R, the process is simple as compared to a process using two resists such as the electrode overlap structure and there is no problem of irregularity of the resist position matching.

Figure 3D:
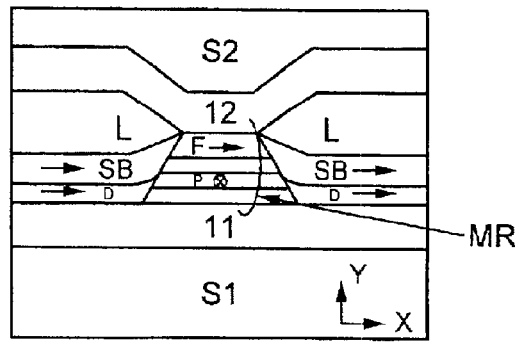
Figure 4:
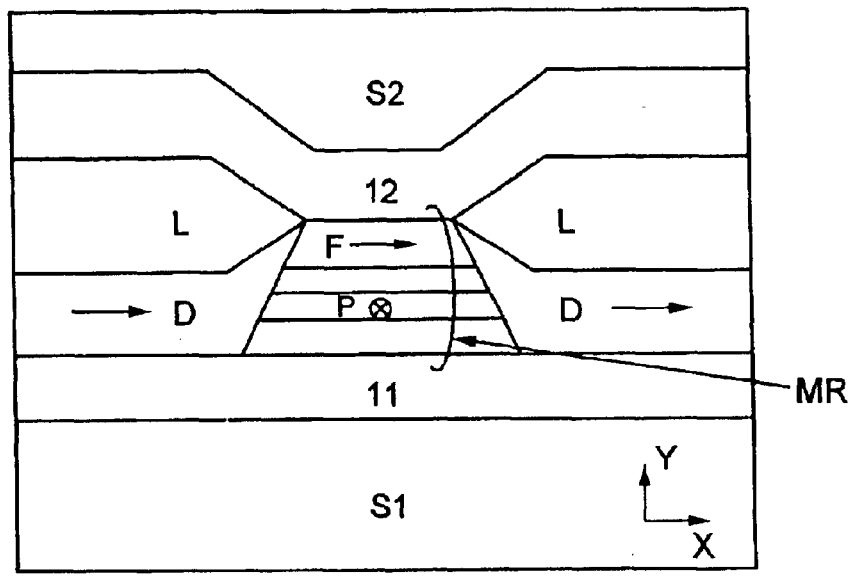
FIG. 4 shows structure of a magneto-resistive head using a conventional spin bulb element viewed from an opposing side of a recording medium.
Figure 5:
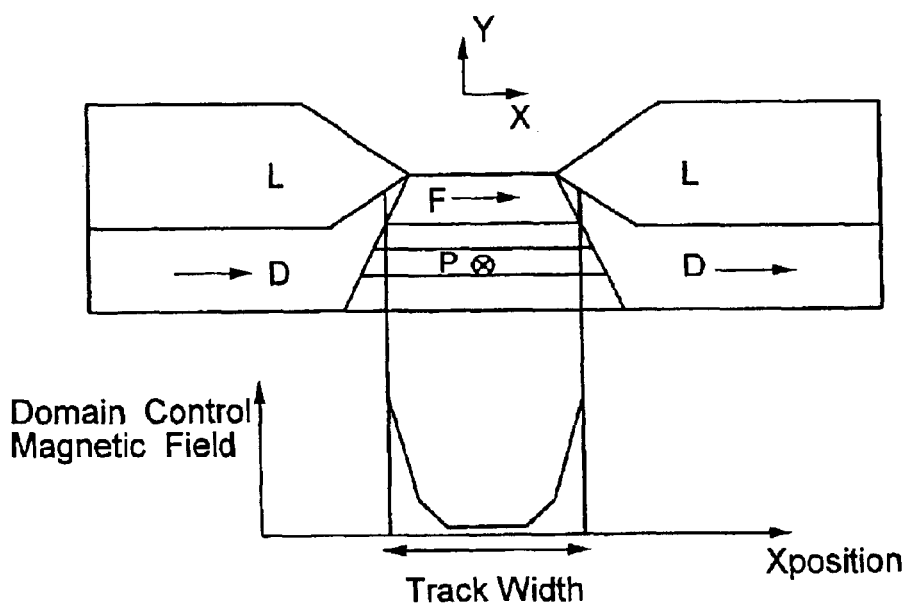
FIG. 5 shows distribution of the magnetic domain control magnetic field in a free layer of hard bias structure of the magneto-resistive head.
Figure 6:
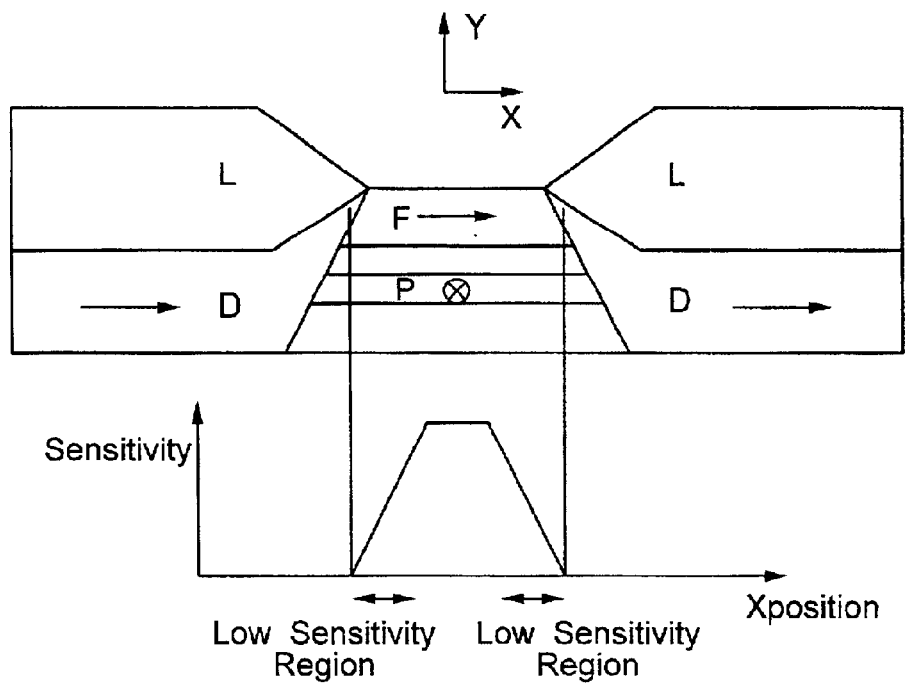
FIG. 6 shows sensitivity distribution in the track width direction of the hard bias structure.
Figure 7:
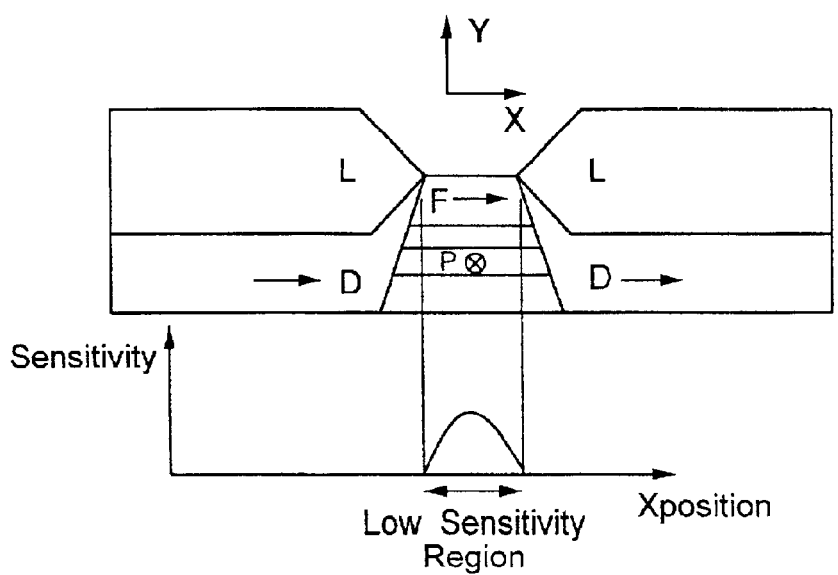
FIG. 7 shows sensitivity distribution in the track width direction of the hard bias structure using an element of a small track width.

Lastly, a spin bulb film MR is formed in the MR height direction and a second insulation film 12 and a second magnetic shield film S2 are formed (FIG. 3D).

With the aforementioned simple process, it is possible to produce a head for a narrow track with a high accuracy.

According to the present invention, it is possible to reduce the low-sensitivity region width of the spin bulb element end portion of the magneto-resistive head and even with the narrow track width, it is possible to enhance the reproduction sensitivity. Moreover, the production process is simple as compared to the electrode overlap structure.

It will be further understood by those skilled in the art that the foregoing description has been made on embodiments of the invention and that various changes and modifications may be made in the invention without departing from the spirit of the invention and scope of the appended claims.

What is claimed is:

1. The magneto-resistive head comprising:

a first and second magnetic shield films;

a spin bulb film formed between the first and the second shield films via an insulation film;

a soft-magnetic film arranged to be in contact with both end portions of a free layer of the spin bulb film;

a permanent magnet film arranged so as to be in contact with the lower portion of the soft-magnetic film and not in contact with the free layer of the spin bulb film; and an electrode film for applying a signal detection current to the spin bulb film;

wherein a distance between the end portion of the free layer of the spin bulb film and the end portion of the permanent magnet is not greater than 1.5 multiplied by a smaller distance among the distance between the permanent magnet film end portion and the first magnetic shield film and the distance between the permanent magnet film end portion and the second magnetic shield film.

2. The magneto-resistive head as claimed in claim 1, wherein the soft-magnetic film has a saturation magnetic flux density not smaller than 0.8 multiplied by a saturation magnetic flux density of the free layer of the spin bulb film.

3. The magneto-resistive head comprising:

a first and second magnetic shield films;

a spin bulb film formed between the first and the second shield films via an insulation film;

a soft-magnetic film arranged to be in contact with both end portions of a free layer of the spin bulb film;

a permanent magnet film arranged so as to be in contact with the lower portion of the soft-magnetic film and not in contact with the free layer of the spin bulb film; and an electrode film for applying a signal detection current to the spin bulb film;

wherein a product of the saturation magnetic flux density of the soft-magnetic film multiplied by the film thickness is 1 to 10 multiplied by the product of the saturation magnetic flux density of the free layer of the spin bulb film multiplied by the film thickness.

* * * * *